United States Patent
Shen et al.

(10) Patent No.: US 8,441,273 B2
(45) Date of Patent: May 14, 2013

(54) TESTING CARD AND TESTING SYSTEM FOR USB PORT

(75) Inventors: Jia Shen, Shenzhen (CN); Yi-Xiao Yu, Shenzhen (CN); Tai-Chen Wang, Tu-Cheng (TW)

(73) Assignees: Hong Fu Jin Precision Industry (ShenZhen) Co., Ltd., Shenzhen (CN); Hon Hai Precision Industry Co., Ltd, New Taipei (TW)

( * ) Notice: Subject to any disclaimer, the term of this patent is extended or adjusted under 35 U.S.C. 154(b) by 409 days.

(21) Appl. No.: 12/947,834

(22) Filed: Nov. 17, 2010

(65) Prior Publication Data

US 2012/0019278 A1      Jan. 26, 2012

(30) Foreign Application Priority Data

Jul. 26, 2010   (CN) .......................... 2010 1 0236802

(51) Int. Cl.
*G01R 31/00*   (2006.01)

(52) U.S. Cl.
USPC ............... 324/756.01; 324/756.05; 324/750.3

(58) Field of Classification Search ........................ None
See application file for complete search history.

(56) References Cited

U.S. PATENT DOCUMENTS

| | | | |
|---|---|---|---|
| 6,807,504 B2 * | 10/2004 | Chen et al. ..................... | 702/118 |
| 2007/0136025 A1 * | 6/2007 | Lo et al. ....................... | 702/122 |

* cited by examiner

*Primary Examiner* — Minh N Tang
(74) *Attorney, Agent, or Firm* — Altis Law Group, Inc.

(57) ABSTRACT

A testing card for a USB port includes first USB contacting pins, a second USB contacting pin, a transmitting circuits, a voltage converting circuit, and a testing portion. The first USB contacting pins are connected to the USB port to receive a number of USB signals. The second USB contacting pin is connected to the USB port to receive a voltage signal from the USB port. The transmitting circuit is electrically connected to the first USB contacting pins to transmit the USB signals therefrom. The voltage converting circuit is electrically connected to the second USB contacting pin to convert the voltage signal to a predetermined level. The testing portion is electrically connected to the outputs of the transmitting circuit and the voltage converting circuit to receive the USB signals and the converted voltage signal.

13 Claims, 2 Drawing Sheets

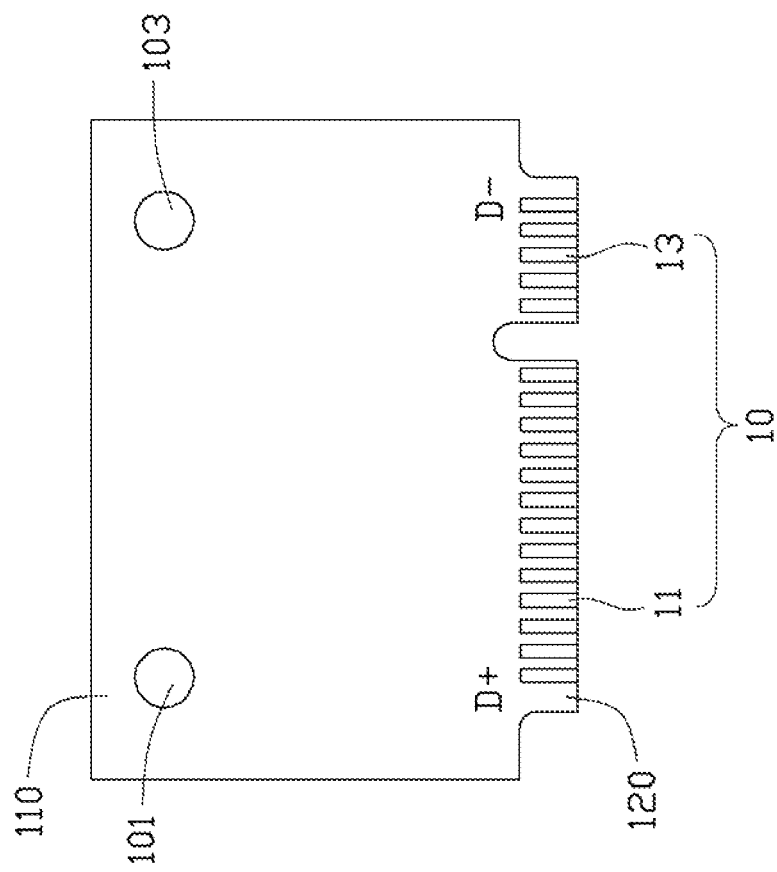

TESTING CARD AND TESTING SYSTEM FOR USB PORT

BACKGROUND

1. Technical Field

The present disclosure relates to testing apparatuses, and more particularly, to a testing card for a Universal Serial Bus (USB) port and a testing system using the testing card.

2. Description of Related Art

USB connectors should be tested after being mounted on motherboards. In one test, connection wires are directly soldered to USB expansion pins on the motherboard, and test probes are connected to the connection wires to test the USB signals from the USB port. However, soldering the connection wires is time consuming, cumbersome, and may damage circuitry on the motherboard.

What is needed, therefore, is a testing card for a USB port and a testing system using the testing card which can overcome the above-described problems.

BRIEF DESCRIPTION OF THE DRAWINGS

The details of the disclosure, both as to its structure and operation, can best be understood by referring to the accompanying drawings, in which like reference numbers and designations refer to like elements.

FIG. 2 is a schematic diagram illustrating the principle of a testing system using the testing card of FIG. 1.

DETAILED DESCRIPTION

Figure 1:
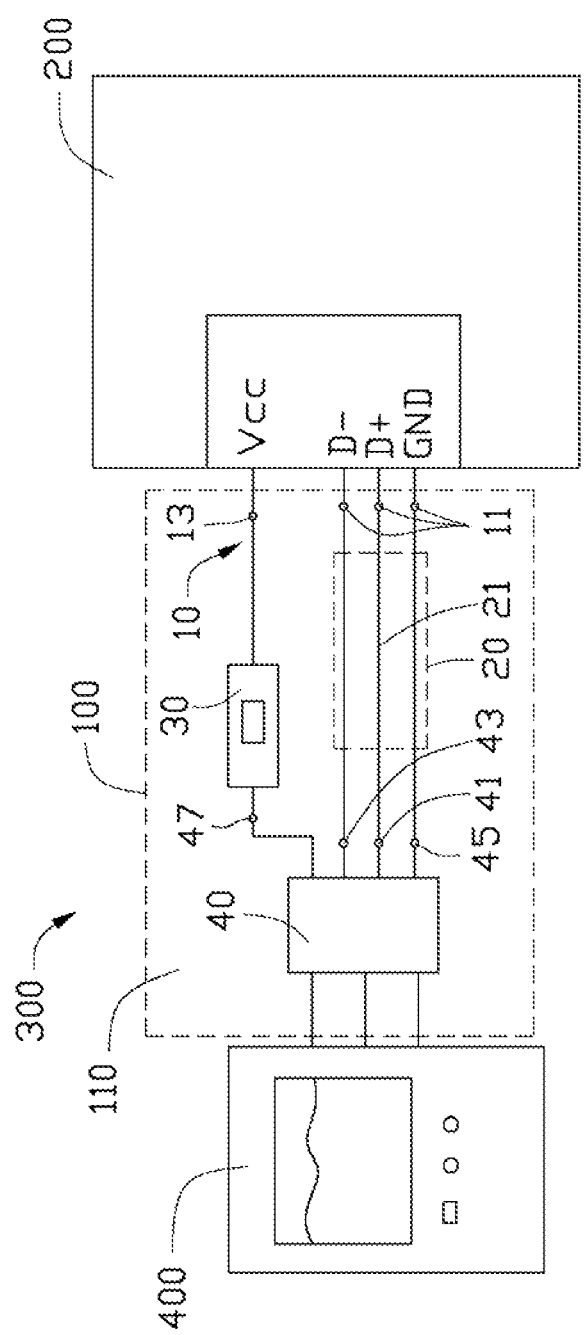
FIG. 1 is a schematic, plan view of a testing card for a USB port, according to an exemplary embodiment.

Referring to FIGS. 1 and 2, an embodiment of a testing card 100 for a USB port 200 includes a number of USB contacting pins 10, a transmitting circuit 20, a voltage converting circuit 30, and a testing portion 40. The inputs of the transmitting circuit 20 and the voltage converting circuit 30 are electrically connected to the USB contacting pins 10 correspondingly. The testing portion 40 is electrically connected to the outputs of the transmitting circuit 20 and the voltage converting circuit 30. In the present embodiment, the testing card 100 is a printed circuit board (PCB) 110, and all of the USB contacting pins 10, the transmitting circuit 20, the voltage converting circuit 30, and the testing portion 40 are integrally formed on the PCB 110.

The USB contacting pins 10 include a number of first pins 11 for receiving USB signals from the USB port 200 and a second pin 13 for receiving voltage from a power source of the USB port 200. The first pins 11 and the second pin 13 are aligned with each other in single file. In the present embodiment, the PCB 110 includes an extending flange 120 formed on an edge thereof, the first pins 11 and the second pin 13 are arranged on the bottom side of the flange 120. A side of each USB contacting pin may be labeled with the name of the corresponding USB contacting pin, e.g. D+, D−, etc.

The input of the transmitting circuit 20 is electrically connected to the first pins 11 and configured to transmit the USB signals from the first pins 11 to the testing portion 40. In the present embodiment, the transmitting circuit 20 includes three peripheral-component-interconnect-express (PCI-e) traces 21 connected to the first pins 11 in parallel.

The input of the voltage converting circuit 30 is electrically connected to the second pin 13. The voltage converting circuit 30 is configured for converting the voltage signal to a predetermined level, according to a predetermined programmed function of the voltage converting circuit 30. In the present embodiment, the voltage converting circuit 30 can boost a voltage signal from 3.3V to be in a range of 4.75V~5.25V. In detail, the voltage converting circuit 30 is a controller chip. The predetermined programmed function is installed in and run by the controller chip. The product number of the controller chip 30 is LTC1872.

In the present embodiment, the testing portion 40 is formed on a side of the PCB 110 opposite to the flange 120. The testing portion 40 includes a first positive direct current (DC) pin 41, a first negative DC pin 43, a first grounded pin 45, and a first power source pin 47. The first positive DC pin 41, the first negative DC pin 43, and the first grounded pin 45 are respectively connected to the outputs of the transmitting circuit 20. The first power source pin 47 is electrically connected to the output of the voltage converting circuit 30, to receive the voltage signal from the voltage converting circuit 30.

Furthermore, the testing portion 40 includes two detection contacts 101, 103 connected to the first positive DC pin 41 and the first negative DC pin 43. In the present embodiment, the detection contacts 101, 103 are protruded from the PCB 110 and made of metal. Note that the detection contacts 101, 103 can instead be two electrically conductive via holes lined with, for example, conductive solder.

In one embodiment, the testing card 100 is used in a testing system 300. The testing system 300 is configured to connect to the USB port 200 of a motherboard (not shown), to determine whether the USB port 200 works.

The testing system 300 includes the testing card 100 and a testing device 400 (e.g. an oscillograph) for connecting to the detection contacts 101, 103 of the testing card 100. A probe of the electronic testing device 400 can be used to make contact with the USB testing portion 40 to obtain parameters of the clock signals, reset signals, interrupt signals, data signals, and address signals of the USB port. The USB port 200 includes a second positive DC pin D+, a second negative DC pin D−, a second grounded pin GND, and a second power source pin Vcc.

When in use, the testing card 100 is inserted to electrically connect to the USB port 200 of the motherboard. In detail, the first pins 11 are electrically and correspondingly connected to the second positive DC pin D+, the second negative DC pin D−, and the second grounded pin GND. The second pin 13 is connected to the second power source pin Vcc. The transmitting circuit 20 communicates with the motherboard when the testing card 100 is connected to the USB port 200, and transmits the USB signals output from the USB port 200 to the testing portion 40. Meanwhile, the voltage converting circuit 30 receives the voltage signal from the motherboard via the second pin 13 and the USB port 200, and the controller chip 30 converts the voltage signal to the predetermined level. The testing portion 40 receives the USB signals from the transmitting circuit 20 and the voltage converting circuit 30. The probes of the oscillograph are electrically connected to the detection contacts 101, 103. When the motherboard is powered on, a waveform of USB signals from the testing card 100 may be displayed on the oscillograph. Users can determine whether the waveform is consistent with the standard waveform or not, thereby determining the performance of the USB port 200.

While various exemplary embodiments have been described, it is to be understood that the disclosure is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A testing card for a USB port, comprising:
   a plurality of first USB contacting pins for receiving a plurality of USB signals from the USB port;
   a second USB contacting pin for receiving a voltage signal from the USB port;
   a transmitting circuit electrically connected to the first USB contacting pins to transmit the USB signals therefrom;
   a voltage converting circuit electrically connected to the second USB contacting pin to convert the voltage signal to a predetermined level; and
   a testing portion electrically connected to the outputs of the transmitting circuit and the voltage converting circuit, to receive the USB signals and the converted voltage signal.

2. The testing card as claimed in claim 1, wherein the testing card is a printed circuit board (PCB), and all of the USB contacting pins, the transmitting circuit, the voltage converting circuit, and the testing portion are integrally formed on the PCB.

3. The testing card as claimed in claim 2, wherein the PCB comprises an extending flange formed on an edge thereof, the USB contacting pins are arranged on a bottom side of the flange.

4. The testing card as claimed in claim 3, wherein the testing portion is formed on a side of the PCB opposite to the flange.

5. The testing card as claimed in claim 1, wherein the first USB contacting pins and the second USB contacting pin are aligned with each other in single file, a side of each USB contacting pin is labeled with the corresponding name.

6. The testing card as claimed in claim 1, wherein the transmitting circuit comprises a plurality of PCI-e traces connected to the first USB contacting pins in parallel.

7. The testing card as claimed in claim 1, wherein the voltage converting circuit is a controller chip.

8. The testing card as claimed in claim 1, wherein the voltage converting circuit is configured to boost a voltage signal from 3.3V to be in a range of 4.75V~5.25V.

9. The testing card as claimed in claim 1, wherein the testing portion comprises a positive direct current (DC) pin, a negative DC pin, a grounded pin, and a power source pin, the positive DC pin, the negative DC pin, and the grounded pin are respectively connected to the output of the transmitting circuit, the power source pin is electrically connected to the output of the voltage converting circuit.

10. The testing card as claimed in claim 9, wherein the testing portion comprises two detection contacts connected to the positive DC pin and the negative DC pin correspondingly.

11. The testing card as claimed in claim 10, wherein the detection contacts are protruded from the PCB and made of metal.

12. The testing card as claimed in claim 10, wherein the detection contacts are shaped as two via holes lined with conductive solder.

13. A testing system for a USB port comprising:
   a testing card connected to the testing device, the testing card comprising:
      a plurality of USB contacting pins connected to the USB port to receive a plurality of USB signals and a voltage signal from the USB port;
      a transmitting circuit electrically connected to some USB contacting pins to transmit the USB signals therefrom;
      a voltage converting circuit electrically connected to the other USB contacting pins to convert the voltage signal from the USB contacting pins to a predetermined level; and
      a testing portion electrically connected to the outputs of the transmitting circuit and the voltage converting circuit, to receive the USB signals and the converted voltage signal; and
   a testing device comprising a plurality of probes electrically connected to the testing portion.

* * * * *